United States Patent [19]

Gilmore, Jr. et al.

[11] Patent Number: 4,659,235

[45] Date of Patent: Apr. 21, 1987

[54] FLUID PRESSURE SENSOR WITH TEMPERATURE INDICATION

[75] Inventors: William N. Gilmore, Jr., Southfield, Mich.; William H. Leaver, Apex, N.C.

[73] Assignee: Borg-Warner Automotive, Inc., Troy, Mich.

[21] Appl. No.: 723,695

[22] Filed: Apr. 16, 1985

[51] Int. Cl.[4] .................... G01K 7/20; G01L 9/06
[52] U.S. Cl. ........................... 374/143; 73/714; 73/727
[58] Field of Search ............... 73/714, 726, 727, 708; 374/143

[56] References Cited

U.S. PATENT DOCUMENTS

| | | | |
|---|---|---|---|
| 3,354,716 | 11/1967 | Wiebe et al. | 374/143 |
| 3,967,188 | 6/1976 | Spencer | 73/708 |
| 4,190,796 | 2/1980 | Ishii | 73/726 |
| 4,262,532 | 4/1981 | Butler et al. | 374/143 |
| 4,300,395 | 11/1981 | Shirouzu et al. | 73/727 |
| 4,366,714 | 1/1983 | Adorni | 73/708 |
| 4,414,853 | 11/1983 | Bryzek | 374/143 |
| 4,554,927 | 11/1985 | Fussell | 73/714 |
| 4,558,238 | 12/1985 | Yamada et al. | 73/708 |
| 4,565,097 | 1/1986 | Dimeff | 73/708 |

*Primary Examiner*—Charles Frankfort
*Assistant Examiner*—Thomas B. Will
*Attorney, Agent, or Firm*—James J. Jennings

[57] ABSTRACT

A pressure sensor is provided by a bridge circuit on a semiconductor diaphragm, with diaphragm deflection being effective to produce an output voltage proportional to the deflecting force. A constant current source is coupled to the energizing terminals of the bridge circuit. By measuring the voltage drop across the semiconductor bridge during operation, an output signal indicative of bridge temperature is obtained. Accordingly two output signals, pressure and temperature, are derived from a single bridge sensor. This produces a compact, accurate transducer assembly for use in an automotive control system, providing two control signals from a single sensor structure.

5 Claims, 5 Drawing Figures

4,659,235

FLUID PRESSURE SENSOR WITH TEMPERATURE INDICATION

BACKGROUND OF THE INVENTION

The present invention is directed to a fluid pressure sensor of the type constructed with a semiconductor diaphragm, and more particularly to such a sensor from which a temperature signal is also derived. Such an arrangement is particularly useful in automotive control systems.

In many control systems a plurality of different signal inputs are utilized to regulate some output function. By way of example in an automotive vehicle having a clutch for regulating transfer of drive torque to the vehicle drive wheels, the application and release of such a clutch can be controlled mechanically, or by fluid, such as air or oil under pressure. When a fluid under pressure is utilized for the application and release of the clutch, it is frequently desirable to monitor the clutch apply pressure and to utilize a signal which varies as some function of the clutch apply pressure in a control system regulating the clutch operation. It is also desirable in many cases to provide an indication of the temperature of the transmission oil or clutch apply fluid. Generally this has been done by providing an additional, separate sensor positioned in the appropriate location to provide the requisite temperature indication.

The space allotted for the provision and mounting of the various sensors is very limited in many modern compact, transaxle combinations. It is therefore a primary consideration of the present invention to provide an effective means for indicating both the pressure and the temperature of the fluid in the clutch control line and/or the transmission, in a minimum physical volume. A corollary consideration is to provide such an arrangement in which the temperature and pressure signals are very accurate over the operating range of the system being controlled. Another important consideration is the provision of such a sensing arrangement in which the sensor itself can be easily replaced, without the necessity of recalibrating the associated control system.

SUMMARY OF THE INVENTION

A pressure and temperature sensor constructed in accordance with the present invention is particularly useful in a vehicle control system. Such a sensor includes a semiconductor diaphragm in which the semiconductor material defines a plurality of resistors interconnected to form a bridge circuit having a pair of input terminals and a pair of output terminals. A first output signal circuit is coupled to the bridge circuit output terminals, to provide a first output signal which varies as a function of the pressure applied to the semiconductor diaphragm. Means, which may include a constant current generator, is provided to apply an excitation current to the bridge circuit input terminals. A second output signal circuit is coupled to the bridge circuit input terminals, to provide a second output signal which varies as a function of the temperature of the semiconductor diaphragm.

THE DRAWINGS

In the several figures of the drawings, like reference numerals identify like components, and in those drawings.

GENERAL SYSTEM ARRANGEMENT

Figure 1:
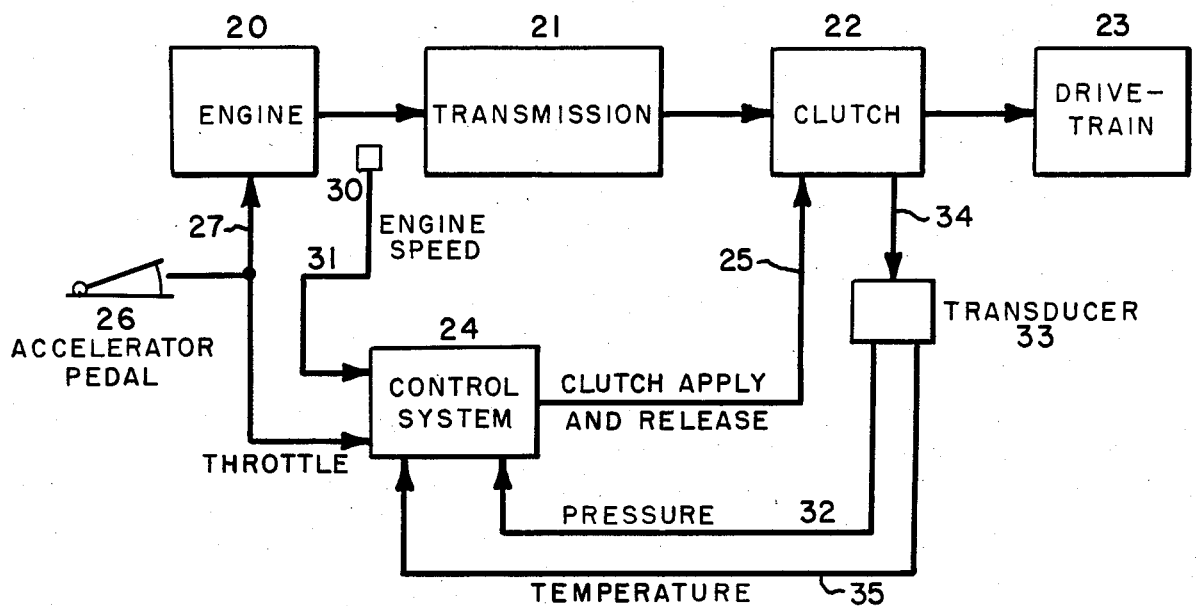
FIG. 1 is a block diagram of a vehicle control system with which the pressure and temperature sensing means of the present invention is useful.

FIG. 1 shows in block form the power flow in an automotive vehicle from an engine 20 through a transmission 21 and, when it is applied, through clutch 22 to the drivetrain 23 which may include other components such as gears, a differential, and so forth. A control system 24 is provided to produce a signal on line 25, to regulate application and release of clutch 22. An accelerator pedal 26 provides a throttle or torque demand signal over line 27 to regulate engine 20, and the same signal is passed over line 27 to the input side of control system 24. A sensor 30 positioned adjacent the engine output shaft produces a signal on line 31 which varies as a function of the engine speed. These input signals on lines 27 and 31 are conventional input signals to a control system for a transmission, and of course other input signals may be utilized in addition, or in place of, the illustrated signals.

One of those additional input signals frequently supplied is a pressure signal from the transmission or clutch chamber, shown in FIG. 1 as provided over line 32 to control system 24. Transducer 33 is connected to receive an input over line 34 from clutch 22, which input signal may be an electrical signal, a force or a pressure, to deflect a component within transducer 33. In accordance with the present invention, the same transducer 33 which provides the pressure output signal on line 32 also provides a temperature output signal on line 35 for application to control system 24. The provision of the two separate signals from a single transducer saves space and weight in the overall transmission and control system package. Even more important is the savings attained by eliminating the connectors and cabling associated with the extra transducer.

Figure 2:
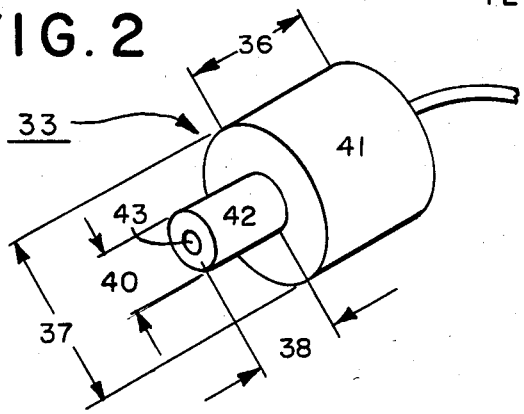
FIG. 2 is a perspective illustration of one embodiment of the present invention.

FIG. 2 depicts one embodiment of the transducer 33 successfully built and tested. The exterior dimensions are referenced 36, 37, 38 and 40 in this showing. To indicate how compact this combination transducer can be, the cylindrical portion 41 had a length (36) of about 0.85 inch, and a diameter (37) of just under one inch. Stem portion 42 which extends from the barrel 41 had a length dimension (38) of about 0.54 inch, and a diameter (40) of about 0.4 inch. A small aperature 43 is provided at the entrance of stem portion 42, allowing a fluid under pressure to enter a channel (not shown) within the stem and bear against a semiconductor diaphragm portion (not shown) within the transducer body. Such transducers are commercially available from the Marvel-Schebler/Tillotson Division of Borg-Warner Automotive, Inc., in Cary, N.C.

Figure 3:
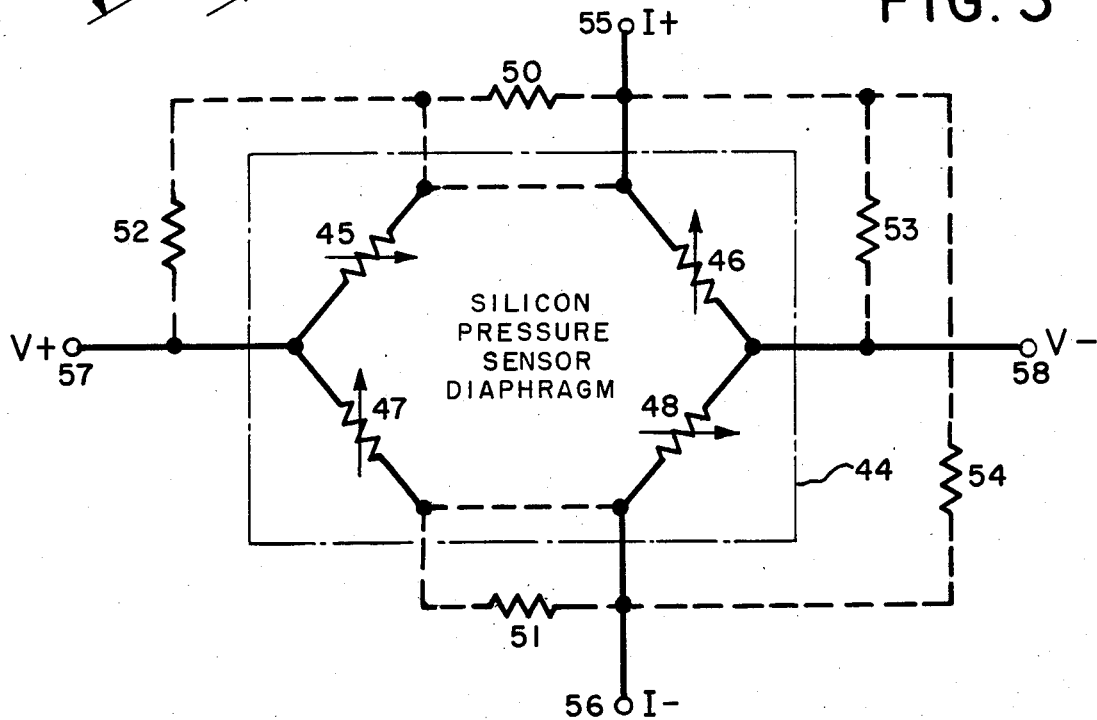
FIG. 3 is a schematic diagram of a known pressure sensor formed with a semiconductor diaphragm.

FIG. 3 depicts a major component of transducer 33, specifically a silicon pressure sensor diaphragm 44. On the diaphragm a bridge circuit including resistors 45, 46, 47 and 48 is produced by diffusing Boron into the silicon diaphragm. These resistors vary in value because of the elastic compression/tension in the diaphragm, as a result of a differential pressure applied across the diaphragm. Resistors 45-48 are highly sensitive to temperature, so that external temperature compensation must be applied. In this compensation procedure, three factors must be normalized to make effective use of the bridge circuit as a pressure sensor. These factors include zero pressure offset, offset temperature coefficient, and span temperature coefficient.

Zero pressure offset is adjusted by adding either resistor 50 or 51 at the position shown. If the initial offset is positive, resistor 50 is adjusted, as by laser trimming, and resistor 51 is shorted. If the offset is negative, then resistor 50 is shorted and resistor 51 is adjusted to give zero output. The offset temperature coefficient is adjusted by adding either resistor 52 or resistor 53, depending on whether the offset temperature coefficient is positive or negative. Then the total temperature span is calibrated to a minimized value by the addition of resistor 54. When these individual compensations are made, the resultant pressure sensor package is compensated for temperature over the desired pressure range. Thus by applying a constant current flow to the bridge input terminals 55 and 56, a suitable output circuit can be coupled to the output terminals 57, 58 to provide an indication of the pressure applied to the diaphragm.

The pressure sensor produced as described above and as shown in FIG. 3 basically comprises materials and techniques now known. Such a pressure transducer is commercially available from IC Sensors, Inc., in Sunnyvale, Calif.

Figure 4:
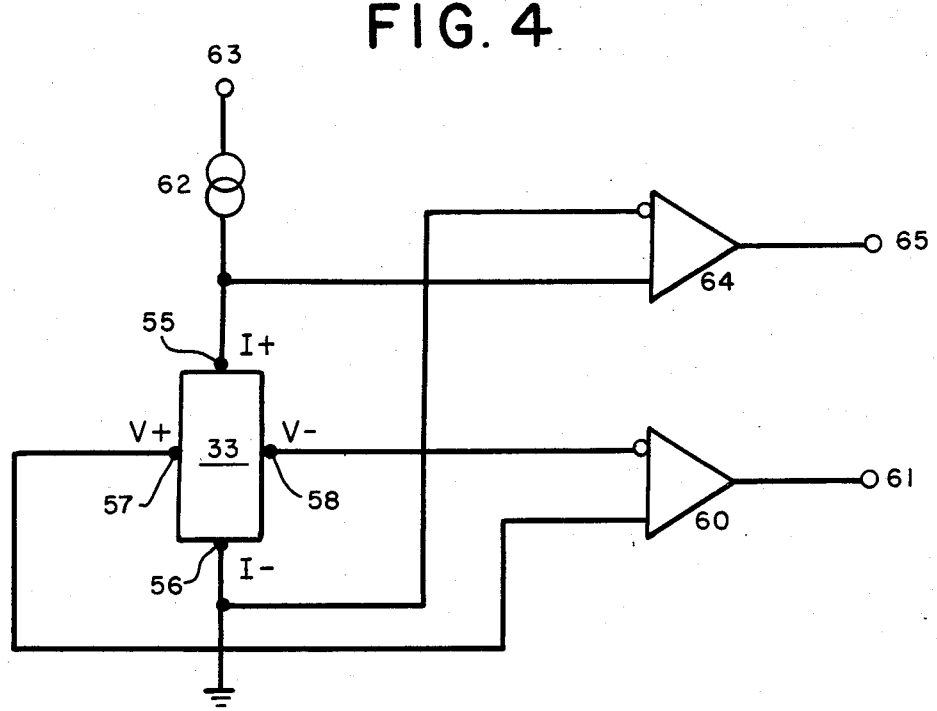
FIG. 4 is a simplified block diagram indicating the general arrangement of the present invention.

FIG. 4 depicts the compensated pressure sensor diaphragm mounted in sensor assembly 33, with a first differential amplifier 60 coupled to the pressure sensor bridge output terminals 57, 58. The voltage signal available at output terminal 61, with respect to a plane of reference potential such as system ground, is thus representative of the pressure exerted on the pressure sensor diaphragm.

It has been known that the resistance change as a function of temperature occurs across input terminals 55, 56 of the bridge circuit shown in FIG. 4. However it has not been appreciated that an additional, temperature-denoting output signal can be derived from these terminals at the same time the pressure-denoting signal is taken from terminals 57, 58. The recognition that both the signals can be produced from a single, compact, accurate sensor for use in an automotive control system is an important aspect of the present invention.

In accordance with the present invention, a constant current generator 62 is coupled between a system input terminal 63 and bridge input terminal 55. The other bridge input terminal 56 is connected to ground. A second differential amplifier 64 has one input connection coupled to the common connection between terminal 55 of the bridge and one side of the constant current generator 62, and its other input terminal coupled (through an inverter input) to system ground. By utilizing a constant current generator 62, the resistance of the bridge is indirectly measured by measuring the voltage drop between the energizing bridge terminals 55 and 56. This voltage drop is then passed through differential amplifier 64 to make available at output terminal 65 a voltage indicative of the temperature of pressure sensor diaphragm 44.

Figure 5:
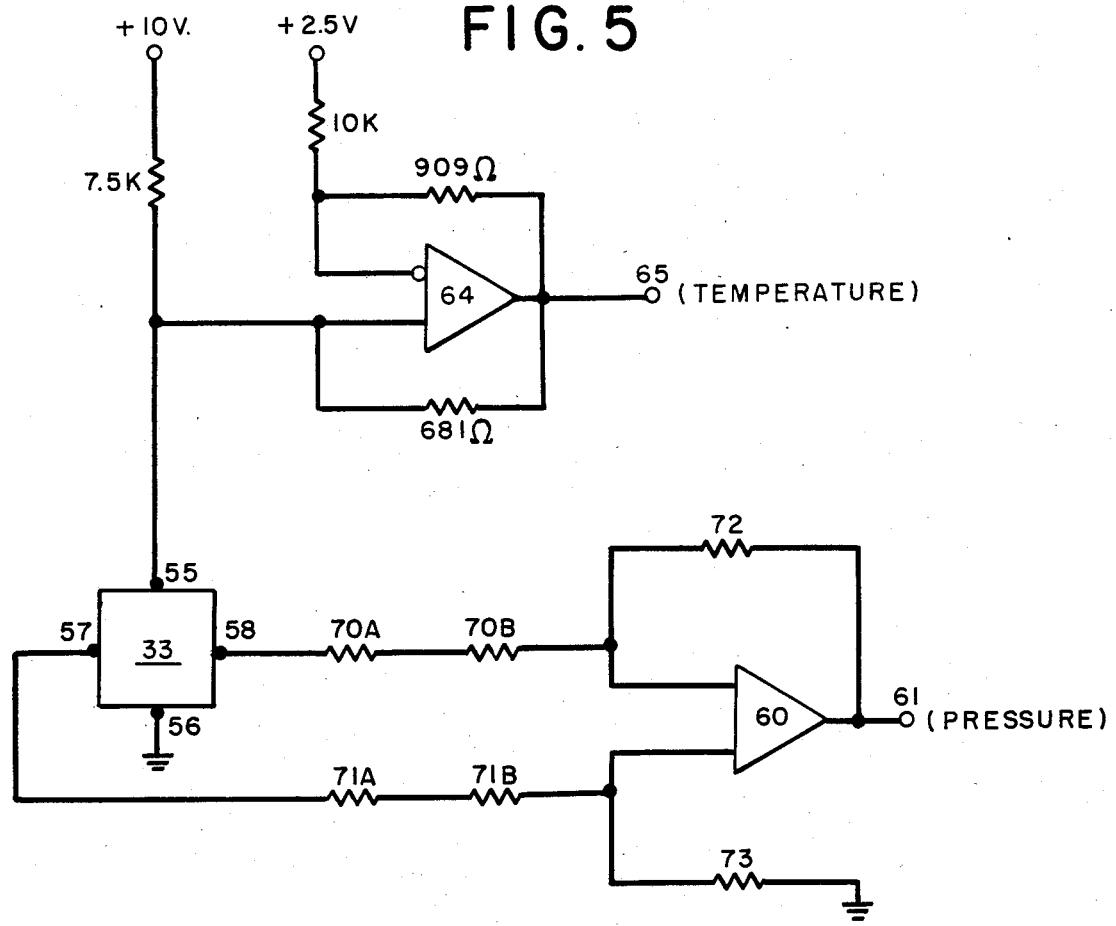
FIG. 5 is a schematic diagram depicting circuit details of one embodiment of the invention.

FIG. 5 indicates the circuit for implementing the pressure and temperature sensing arrangement of the invention. As shown a constant current supply in the form of a Howland circuit is utilized in connection with differential amplifier 64. A 7.5 K resistor is coupled between a source of voltage and output bridge terminal 65. A 2.5 volt voltage is applied to one side of a 10 K resistor, the other side of which is coupled through an inverter to one input connection of stage 64, and to one side of a 909 ohm resistor. The other side of this resistor is connected to the output of stage 64. A 681 Ohm resistor is connected in a feedback back around stage 64.

In the pressure sensor output circuit, precise resistor values are not given because the values of resistors 70A and 71A are not set. These resistors are coupled to the output bridge terminals 57, 58. Resistor 70B is coupled between resistor 70A and one input terminal of stage 60, and resistor 71B is coupled between resistor 71A and the other input terminal of stage 60. Resistor 73 is coupled to this latter input terminal, and to ground. Resistor 72 is connected to provide a feedback back around differential amplifier 60.

The span of the output voltage at terminal 61 as a function of pressure applied to the diaphragm can be normalized to the sensor die by trimming resistor 70A so that its value is equal to the value of resistor 70B, with both of these resistors being formed on the sensor substrate. When trimmed the ohmic value of these resistors will be in the range of 117 to 450 K, due to both the die characteristics and the effects of resistor 53 (FIG. 3), the span temperature compensation resistor.

The gain of stage 60 will then be the ratio of resistor 72 to the sum of resistors 70A and 70B which will be equal to the ratio of resistor 73 to the sum of resistors 71A and 71B. In this way the ohmic values of the resistors in the pressure sensing output circuit are determined.

The system of this invention is very useful where space is at a premium. In systems such as those used in conjunction with an automatic transmission for an automobile or a truck, there are clear advantages and cost savings by obviating the need for a separate temperature transducer and associated cabling and connectors, which may exceed the cost of the transducer itself. Moreover the system allows for compact packaging and effective disposition in a minimum available space in the transmission housing.

In the appended claims the term "connected" (when used in an electrical or electronic sense) means a d-c connection between two components with virtually zero d-c resistance between those components. The term "coupled" indicates there is a functional relationship between two components, with the possible interposition of other elements (including air) between the two components described as "coupled" or "intercoupled". The term "vehicle" includes water-borne and airborne vehicles.

The sensor of this invention is particularly useful in a control system for an automotive drive system. While the transducer is shown as associated with a clutch, it could be and has been associated with a transmission. As a practical matter the clutch may be included within the same housing which functions as the transmission housing.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A pressure and temperature sensor for use in a vehicle control system, comprising:
   a single, pressure-responsive semiconductor diaphragm in which the semiconductor diaphragm material defines a plurality of resistors which change resistance as a function of temperature change, which resistors are interconnected to form a Wheatstone bridge circuit having a pair of input terminals and a pair of output terminals;
   a first output signal circuit, coupled to the bridge circuit output terminals, for providing a first output signal which varies as a function of the pressure applied to the semiconductor diaphragm;
   means for applying an excitation current to the bridge ciruit input terminals;
   a second output signal circuit coupled to the bridge circuit input terminals, for providing a second output signal which varies as a function of the temperature of the pressure-responsive semiconductor diaphragm; and
   means for using the first and second output signals in the vehicle control system.

2. A pressure and temperature sensor as claimed in claim 1, and in which the excitation current applied to the bridge circuit is a constant current.

3. A vehicle control system for regulating the transfer of drive from an engine to a drivetrain, with at least one unit between the engine and drivetrain including a fluid pressure, which control system utilizes control signals denoting the pressure and the temperature of said fluid, the improvement comprising a single sensor for providing both of said control signals, which sensor includes:
   a single, pressure-responsive semiconductor diaphragm in which the semiconductor diaphragm material defines a plurality of resistors which change resistance as a function of temperature change, which resistors are interconnected to form a Wheatstone bridge circuit having a pair of input terminals and a pair of output terminals;
   a first control signal circuit, coupled to the bridge circuit output terminals, for providing a first control signal which varies as a function of the pressure applied to the semiconductor diaphragm;
   means for applying an excitation current to the bridge circuit input terminals;
   a second control signal circuit, coupled to the bridge circuit input terminals, for providing a second control signal which varies as a function of the temperature of the pressure-responsive semiconductor diaphragm; and
   means for using the first and second output signals in the vehicle control system.

4. A vehicle control system as claimed in claim 3, and in which the excitation current applied to the bridge circuit is a constant current.

5. A vehicle control system for use with an automotive drive system including an engine, a transmission and a drivetrain, and a clutch connected to regulate the transfer of torque from the engine to the drivetrain, which control system is connected to receive first and second control signals denoting the pressure and the temperature of fluid within at least one of the transmission and clutch units, the improvement comprising a single sensor for providing both the first and second control signals, which sensor includes:
   a single, pressure-responsive semiconductor diaphragm in which the semiconductor material defines a plurality of resistors interconnected to form a Wheatstone bridge circuit having a pair of input terminals and a pair of output terminals;
   a first control signal circuit, coupled to the bridge circuit output terminals, for providing a first control signal which varies as a function of the pressure applied to the semiconductor diaphragm;
   means for applying a constant excitation current to the bridge circuit input terminals;
   a second control signal circuit, coupled to the bridge circuit input terminals, for providing a second control signal which varies as a function of the temperature of the pressure-responsive semiconductor diaphragm; and
   means for using the first and second output signals in the vehicle control system.

* * * * *